United States Patent [19]

Taube

[11] 4,062,472
[45] Dec. 13, 1977

[54] LIQUID DISPENSING SYSTEM

[75] Inventor: Frank Taube, Southfield, Mich.

[73] Assignee: Dominion Tool & Die Co., Inc., Roseville, Mich.

[21] Appl. No.: 704,014

[22] Filed: July 9, 1976

[51] Int. Cl.² ............................................. B67D 1/08
[52] U.S. Cl. ....................................... 222/1; 222/148
[58] Field of Search ....................... 222/148, 145, 57, 1

[56] References Cited

U.S. PATENT DOCUMENTS

| 1,526,001 | 2/1925 | La Rue | 222/148 |
| 1,915,728 | 6/1933 | Gabler | 222/148 |
| 3,049,267 | 8/1962 | Edwards et al. | 222/148 X |
| 3,212,676 | 10/1965 | Trumbull et al. | 222/148 X |
| 3,876,114 | 4/1975 | Hicks et al. | 222/148 |

*Primary Examiner*—Allen N. Knowles
*Assistant Examiner*—Hadd Lane
*Attorney, Agent, or Firm*—Harness, Dickey & Pierce

[57] ABSTRACT

A system for accurately mixing two or more liquids and for dispensing the mixture. The system is generally adapted for use in paint spraying operations. The flow of one of the components is accurately measured by means of a flow meter and the measured value provides a signal to control a valve which, in turn, controls the flow of the other liquid. Periodically the volume of the first mentioned liquid is measured for a given time period so as to make necessary adjustments in the flow meter-valve interconnection. An improved arrangement is provided for purging a mixing manifold immediately prior to the completion of the dispensing cycle so that none of the mixture will be wasted. The control arrangement includes improved air operated two and three-way valves.

6 Claims, 3 Drawing Figures

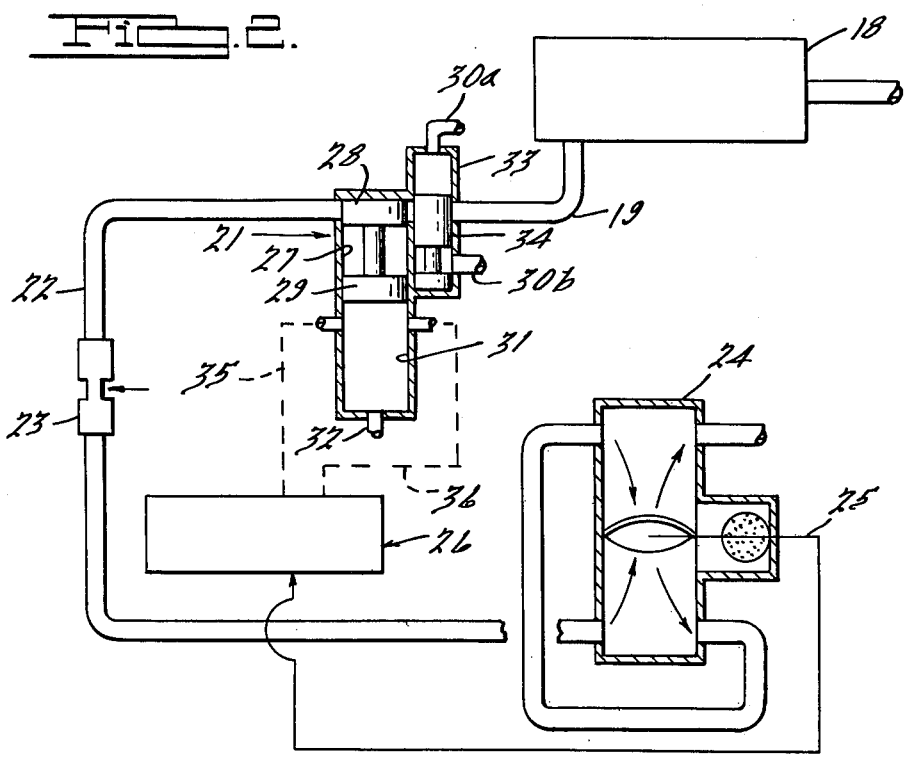
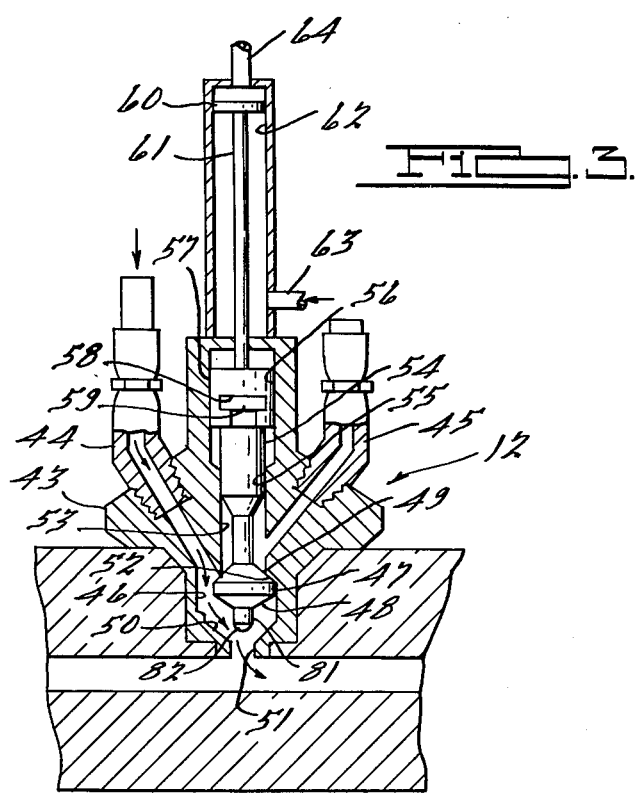

LIQUID DISPENSING SYSTEM

BACKGROUND OF THE INVENTION

This invention is particularly adapted to be embodied in a liquid dispensing system and more particularly to one in which wastage of liquid is eliminated.

Many systems are provided that are employed to selectively discharge fluid. Such systems generally include a control valve and a discharge nozzle, which components may be separated by a finite length of conduit. When the valve is moved to its closed position, a certain amount of liquid is trapped between the valve and the discharge. This trapped fluid is either lost or incorrectly dispensed at the beginning of the next dispensing step.

It is, therefore, a prinicipal object of this invention to provide an improved liquid dispensing system that is accurate and does not waste liquid being dispensed.

It is further object of the invention to provide a liquid dispensing system in which the portion of the conduit between the control valve and the discharge is purged at the completion of each discharge cycle.

SUMMARY OF THE INVENTION

This invention is adapted to be embodied in a method and system for dispensing liquid from a conduit having a flow control valve and a spaced discharge. The method comprises the steps of closing the flow control valve prior to discharge of the desired amount of liquid and subsequent pressurizing the portion of the conduit between the valve and discharge for purging the conduit portion of entrapped fluid. The apparatus for performing this method includes additional valve means communicating with the portion of the conduit and adapted to admit, at selected time intervals, a purging medium.

BRIEF DESCRIPTION OF THE DRAWINGS

FIG. 2 is a view, in part similar to FIG. 1, showing certain components of the system in another mode of operation.

FIG. 3 is an enlarged cross-sectional view of one of the valves used in the system.

DETAILED DESCRIPTION OF THE PREFERRED EMBODIMENTS

Figure 1:
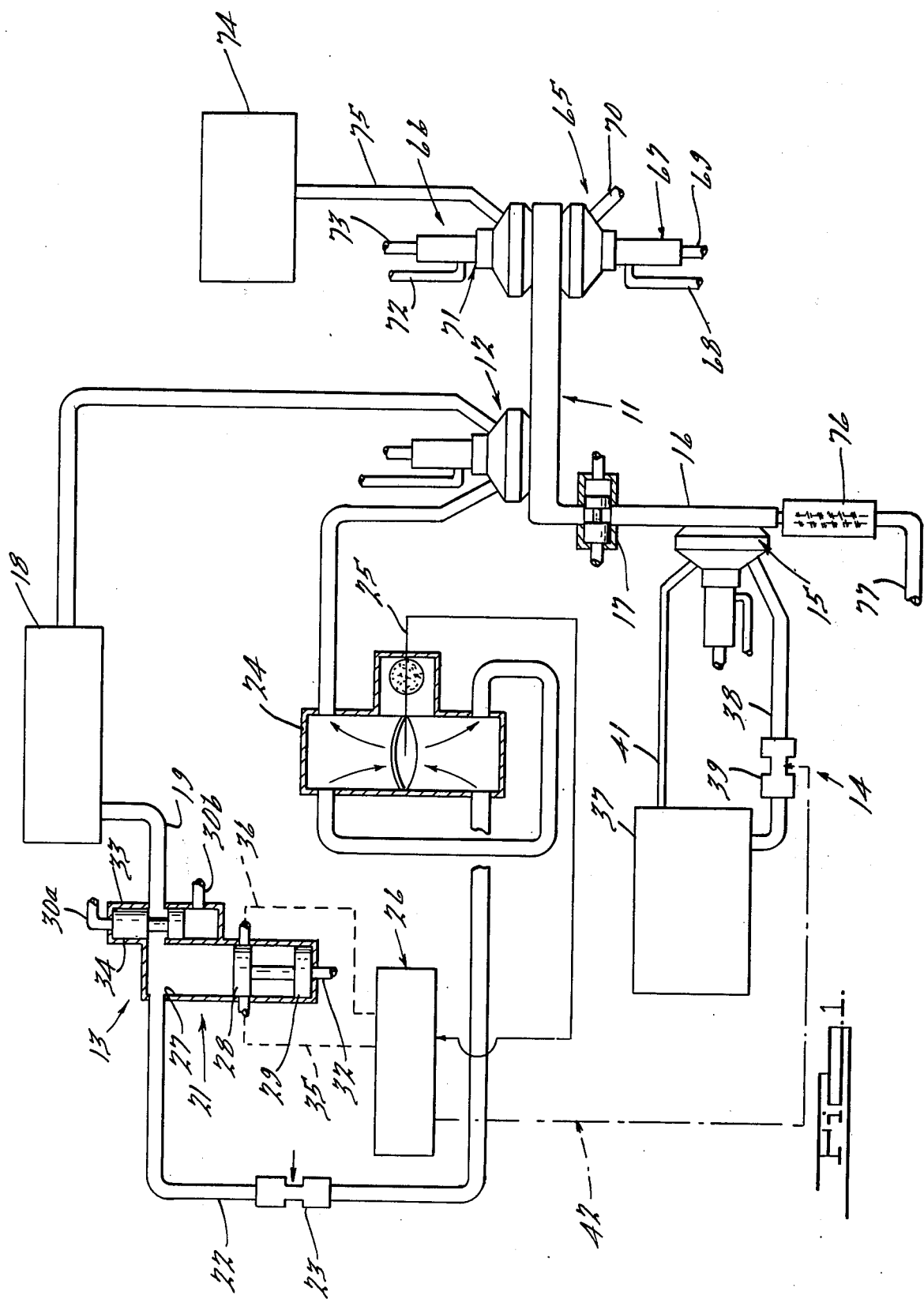
FIG. 1 is a partially schematic, partially cross-sectional view of a fluid mixing and dispensing system embodying this invention.

FIG. 1 illustrates, in part schematically, a fluid mixing and dispensing system embodying the invention. The system is particularly adapted for mixing and dispensing paints. It should be understood, however, that other applications for the invention will present themselves to those skilled in the art. The disclosed system is particularly adapted for use in production lines where a plurality of different colors may be sprayed. In order to establish the color mixing or blending of the painting materials, individual pigment mixtures are combined with a common constituent. It should be readily apparent that the exact ratio of the mixture components must be accurately controlled so as to insure uniformity in paint mixture. The described apparatus is particularly adapted for achieving this result.

Referring now to the drawings, the element 11 indicates generally a manifold that is adapted to receive the optional mixture components, each of which is supplied by a respective three-way valve, one of which is indicated generally by the reference numeral 12. It is to be understood that there will be any suitable number of such three-way valves depending upon the number of optional mixture components to be employed. For the sake of illustration, only one such three-way valve 12 and one optional component system, indicated generally by the reference numeral 13 have been illustrated. A common component system, indicated generally by the reference numeral 14 supplies a common component by means of a three-way valve 15 to the discharge conduit 16 of the manifold 11. A main shut-off valve 17 controls the flow between the manifold 11 and conduit 16, as will become apparent.

Referring now to the optional component system 13, this system includes an optional component reservoir 18 in which the optional component is stored. In the described embodiment, the reservoir 18 may hold the paint mixture of predetermined pigment. The reservoir 18 discharges through a conduit 19 into a fluid displacement sampler, indicated generally by the reference numeral 21. As will become more apparent as this description proceeds, the sampler 21 is intended to periodically determine the exact flow rate of the components fed from the reservoir 18 and to provide a corrective signal that will correct for variations in flow rate caused by changes in specific gravity, temperature and/or viscosity.

A conduit 22 provides the discharge from the fluid displacement sampler 21. A flow control valve 23 is provided for controlling the flow of the optional mixture component. The valve 23 may be positioned in the conduit 22, as illustrated, or in the return conduit connecting the valve 12 with the reservoir 18. A differential transducer 24 is positioned in the conduit 22 and functions to provide a continuous signal of the rate of flow of the optional component from the reservoir 18. The differential transducer 24 measures the pressure drop across a finite length flow loop provided within the transducer 24 and, in turn, gives an out-put signal via a conductor 25 that is indicative of the flow rate. Since the transducer 24 is responsive to pressure drop, the indicated flow rate will vary with specific gravity and temperature. Said another way, the signal provided with the conductor 25, if correct at a given temperature, specific gravity, and viscosity, will have to be modified or corrected if the temperature, specific gravity and/or viscosity change. The fluid displacement sampler 21 provides the necessary updating information to correct this data, as will be described. The out-put signal from the conduit 25 is delivered to a monitoring computer indicated generally by the reference numeral 26.

The fluid displacement sampler 21 also provides a signal to the monitoring computer 26 so as to update the data provided by the differential transducer 24 as will now be described, by particular reference to FIGS. 1 and 2. The fluid displacement sampler 21 includes a cylinder 27 of predetermined finite volume. A piston 28 is slidably supported in the cylinder 27 and is movable from a maximum volume position (FIG. 1) to a minimum volume position (FIG. 2). A separate piston head 29 is integrally connected to the piston 28 and cooperates with an air chamber 31 formed below the piston head 29 that may be pressurized by a suitable air source via the conduit 32 to urge the piston 28 from the position shown in FIG. 1 to the position shown in FIG. 2.

The portion of the cylinder 27 above the piston 28 receives the optional mixture components from the reservoir 18 and conduit 19 via an air operated valve 33. The valve 33 includes a spool 34 that is movable between an opened position (FIG. 1) and a closed position (FIG. 2).

In order to effect the correction of the monitoring computer 26 a predetermined volume of fluid is charged into the chamber 27. This occurs due to the pressure in the conduits 19 and 22 when the valve spool 34 is in its opened position. This pressure in the conduits urges the piston 28 downwardly to the position shown in FIG. 1. When sampling is to be effected, the valve spool 34 is moved to its closed position, (FIG. 2) by appropriately pressurizing the upper side of this valve through a conduit 30a. This cuts off communication between the reservoir 18 and conduit 22. Simultaneously, the piston head 29 is pressurized by admitting air under pressure at a predetermined value through the conduit 32. This drives the piston 28 upwardly to displace the volume of optional mixture components trapped in the cylinder 27.

The position of the piston 28 is sensed by optical sensors (not shown) and provides a signal to the monitoring computer 26 by conductors 35 and 36. The time required by the piston 28 to move between the two positions and displace the predetermined volume of optional mixture component from the cylinder 27 will provide an accurate indication of the flow rate of this fluid. Said another way, the time which it takes to displace this fluid will be related to viscosity, temperature and specific gravity. This data is then fed into the computer 26 to correct the signal received from the differential transducer 24 by the conductor 25.

After sampling, the cylinder 27 is recharged by returning the valve spool 34 to its opened (FIG. 1) position. This is accomplished by venting conduit 30a and pressurizing a conduit 30b that enter the valve chamber below the spool 34.

This corrected signal is used to control the flow from the common component system 14, as will now be described. The system 14 includes a reservoir 37 in which the common mixture component is stored. This component is conveyed via a conduit 38 in which a binary flow control valve 39 is positioned, to the three-way valve 15. A return path 41 is provided from the three-way valve 15 to the reservoir 37 so that the common mixture component contained in the reservoir 37 is continuously flowing. The binary flow control valve 39 is controlled by the monitoring computer 26 as schematically indicated by the broken line 42 so as to maintain the desired ratio of flow between the mixtures in the reservoirs 18 and 37.

The construction of the three-way valves 12 and 15 and their operation will be described by reference to FIG. 3, wherein the valve 12 is shown in detail. It is to be understood that the construction of the valves 12 and 15 is identical. The valve 12 is comprised of a main valve body 43 formed with an inlet conduit 44 and a return conduit 45. The conduit 44 extends into a valve chamber 46 in which a movable valve member 47 is positioned. The valve member 47 has a pair of opposed valving surfaces 48 and 49. The surface 48 cooperates with a valve seat 50 to control the flow through a discharge conduit 51. The valve member 47 has a cylindrical projection 81 extending from the seat 48. In the new, unworn condition the projection 81 has the same length as the discharge conduit 51. Thus no fluid can be trapped in the end of the conduit 51 when the valve 47 is in its closed position. This also facilitates purging of the manifold 11. If wears occurs, the projection 81 will extend slightly into the passage of the manifold 11 when the valve 47 is closed. If desired the projection 81 may have a spherical end 82 that extends slightly into the manifold passage. This will induce some slight turbulance to the flow through the manifold 11. The valve surface 49 cooperates with a valve seat 52 to control communication with a return chamber 53 that is intersected by the return conduit 45.

The valve member 47 has an operating spool portion 54 that is slidably supported in a bore 55, which is an extension of the return chamber 53. The bore 55 terminates in an enlarged counterbore 56. An operating member 57 is slidably supported in the counterbore 56 and has a groove 58 that receives a tongue 59 on the valve portion 54 to couple the valve operating member 57 to the valve 47.

The valve operating member 57 is connected to a piston 60 by a piston rod 61. The piston 60 is slidably supported in a chamber 62. An air conduit 63 communicates with the chamber 62 below the piston 60. A second air conduit 64 communicates with the chamber 62 on the upper side of the piston 60.

FIG. 3 illustrates the three-way valve in the discharge position. In this position, the chamber 62 is pressurized by the conduit 63 and the conduit 64 is vented to atmosphere. The air pressure acts on the lower side of the piston 60 and urges it and the valve 47 upwardly. The valve surface 49 contacts the seat 52 and closes off the return passage 45. Flow is then permitted from the inlet passage 44 through the valve chamber 46 past the valve seat 50 and out the discharge opening 51. To cut off discharge, the conduit 63 is vented to atmosphere and the conduit 64 is pressurized. The pressure then acts on the upper side of the piston 60 to drive it and the valve 47 downwardly. The valve surface 48 then contacts the seat 50 and closes off communication with the discharge passage 51 and the projection 81 forces any remaining fluid from the passage 51. At the same time, the valve surface 40 moves away from the valve seat 52 and opens communication with the return passage 45.

Also communicating with the interior of the manifold 11 is a soft air system for purging the manifold of mixture components, indicated generally by the reference numeral 65 and a solvent flushing system, indicated generally by the reference numeral 66. The purging system 65 is comprised of a two-way valve, indicated generally by the reference numeral 67. The two-way valve 67 is operated between an opened and closed position by means of air conduits 68 and 69 respectively. The two-way valve 67 is substantially the same in construction as the three-way valve 12 which was previously described. With this valve, however, no return conduit is provided. The valve 67 functions purely as an on/off valve to control air from a pressure source of predetermined value through a conduit 70.

The flushing system 66 also includes a two-way valve, indicated generally by the reference numeral 71. The two-way valve 71 is operated between an opened and a closed position by means of air conduits 72 and 73 respectively. The two-way valve 71 controls the flow of solvent from a reservoir 74 through a conduit 75 into the manifold 11.

OPERATION

FIG. 1 illustrates the system in the condition prior to spray painting. In this condition, the optional mixture components from the respective reservoirs 18 are continuously circulated through the open valve 33, differential pressure flow transducer 24 and three-way valves 12, which are in their return flow condition. The differential flow transducer 24 will provide a continuous signal to the monitoring computer 26 of the flow rate of the optional mixture component from the reservoir 18. If the flow rate is outside of predetermined limits, the computer 26 may be programmed to provide a signal to this effect.

The common mixture component from the reservoir 37 is recirculated through the three-way valve 15 that is in its return flow mode. At this time, the binary control valve 39 is maintained in a full opened position. The solvent flushing system 66 will be closed as will the soft air purging system 65. The fluid displacement sampler 21 will be operated periodically to update the signals to the monitoring computer 26, in the manner previously described.

When paint discharge is required, the operator sets the desired color, thus conditioning the proper optional component reservoir 18 for discharge. At this time, the signal from the monitoring computer 26 will set the binary control valve 39 to the appropriate position to establish the desired mixture ratio. When a specific optional component reservoir 18 is selected for delivery, the automatic cycling of the fluid displacement sampler 21 is disabled so that the flow from this component will not be affected during discharge. Immediately prior to opening of the valves 12, 15 and 17 the interior of the manifold 11 is evacuated by means of a vacuum pump or the like. This insures that the manifold 11 will be completely charged with the selected optional mixture component when the selected valve 12 is opened. If this were not done, an uneven initial flow might occur due to the different locations of the respective valves 12 along the length of the manifold 11.

When discharge is desired, the three-way valves 12 and 15 are cycled from their return to their discharge positions. At the same time, the shut-off valve 17 will be opened. The components are then discharged into a mixer 76 for discharge from a conduit 77 into a spray gun (not shown).

Immediately prior to the completion of spraying, as set by a timer or an external signal, the three-way valve 12 will be returned to its return position cutting off communication between the reservoir 18 and the manifold 11. A finite volume of fluid will be trapped in the manifold 11, the volume being chosen to be sufficient to complete the spraying operation. The soft air purging system 65 is then actuated to purge the trapped components from the manifold 11. This is done by opening the valve 67 and permitting air under a predetermined pressure to enter the manifold 11 from the conduit 70. The purging air is admitted at a pressure that is equal to the pressure which existed in the manifold 11 immediately prior to closure of the valve 12. It should be understood that each of the optional mixture components may be circulated at a different pressure. This will purge the remaining optional mixture components from the manifold 11.

Once spraying is completed, the manifold 11 is cleaned by the solvent system 66 and the air system 65 which are pulsed intermittently. Alternately, the valve 71 is opened to permit flow of solvent from the reservoir 74 through the conduit 75 into the manifold 11 and air is forced through the manifold. The solvent is flushed through the manifold 11, conduit 16, mixer 76 and out the spray gun. At this time, the three-way valve 15 is also placed in the return condition. After a predetermined amount of alternate air and solvent pulsing, the manifold 11 is dried by closing of the solvent valve 71 and reopening of the air valve 67. The air pressure during the cleaning cycle is much higher than during the purging cycle. This completes the cycle and places the system in operation for the next discharge.

It is to be understood that the foregoing description is that of a preferred embodiment of the invention. Various changes and modifications may be made without departing from the spirit and scope of the invention as defined by the appended claims.

I claim:

1. The method of dispensing a liquid from a manifold having a plurality of inlets each controlled by a respective flow control valve and a discharge spaced downstream from the flow control valves comprising the steps of closing the respective flow control valve prior to discharge of the desired amount of liquid from the respective inlet and pressurizing the portion of the manifold between the valves and the discharge for purging the manifold of the entrapped liquid.

2. The method as set forth in claim 1 wherein the purging pressure is applied at the same pressure as exists in the conduit upstream of the valve prior to its closure.

3. The method as set forth in claim 1 further including the step of cleaning the conduit portion of retained liquid by introducing a solvent therethrough subsequent to the purging step.

4. The method as set forth in claim 3 wherein the purging pressure is applied at the same pressure as exists in the conduit upstream of the valve prior to its closure.

5. A system for dispensing a liquid from a manifold comprising a plurality of flow control valves, having their outlet sides communicating with said manifold, a discharge, said discharge being connected to said manifold at a point spaced from said flow control valves, each of said flow control valves being movable between an open position and a closed position, a purging valve communicating with said manifold between said flow control valves and said discharge, said purging valve being movable between an open position and a closed position for introducing a purging fluid into said manifold, and control means for sequentially moving respective of said flow control valves from its open position to its closed position and said purging valve from its closed position to its open position for purging said manifold of the dispensed liquid at the completion of a dispensing cycle.

6. A system as set forth in claim 5 further including a solvent control valve communicating with said conduit portion, said solvent valve being movable between a closed position and an open position for introducing a solvent into said conduit portion.

* * * * *